(12) United States Patent
Bauer et al.

(10) Patent No.: US 7,950,699 B2
(45) Date of Patent: May 31, 2011

(54) PLUG-TYPE COUPLING

(75) Inventors: Andreas Bauer, Maintal (DE); Reiner Koch, Obernburg (DE)

(73) Assignee: Norma Germany GmbH, Maintal (DE)

( * ) Notice: Subject to any disclaimer, the term of this patent is extended or adjusted under 35 U.S.C. 154(b) by 714 days.

(21) Appl. No.: 11/435,615

(22) Filed: May 17, 2006

(65) Prior Publication Data
US 2006/0273578 A1    Dec. 7, 2006

(30) Foreign Application Priority Data

May 18, 2005 (DE) .......................... 10 2005 023 583

(51) Int. Cl.
*F16L 39/00* (2006.01)
(52) U.S. Cl. .......................... 285/319; 285/305; 285/307
(58) Field of Classification Search .................. 285/305, 285/307, 319, 18, 310, 317
See application file for complete search history.

(56) References Cited

U.S. PATENT DOCUMENTS

| 1,513,710 | A | | 10/1924 | Lewis | |
|---|---|---|---|---|---|
| 2,203,428 | A | | 12/1935 | Voss | |
| 3,428,340 | A | * | 2/1969 | Pelton | 285/95 |
| 4,471,978 | A | | 9/1984 | Kramer | |
| 4,541,657 | A | | 9/1985 | Smyth | |
| 4,561,682 | A | | 12/1985 | Tisserat | |
| 4,884,829 | A | * | 12/1989 | Funk et al. | 285/305 |
| 4,991,880 | A | * | 2/1991 | Bernart | 285/305 |
| 7,128,347 | B2 | * | 10/2006 | Kerin | 285/305 |
| 7,338,086 | B2 | * | 3/2008 | Poder et al. | 285/319 |

FOREIGN PATENT DOCUMENTS

| DE | 24 44 245 | 4/1976 |
|---|---|---|
| DE | 24 44 245 | 9/1976 |
| DE | 43 00 037 | 4/1994 |
| JP | 7-22756 | 4/1995 |

* cited by examiner

Primary Examiner — Aaron Dunwoody
(74) Attorney, Agent, or Firm — Lucas & Mercanti, LLP; Klaus P. Stoffel

(57) ABSTRACT

A plug-type coupling for connecting two fluid lines includes a coupling component which has an opening with an adjacent receiving duct, and a coupling piece which is inserted into the receiving duct and has a holding rib which extends from its circumference outwardly and forms a locking surface, wherein the holding rib interacts with a locking stirrup which has at least one leg which is resilient toward the opening. A disassembly element is movably mounted in the coupling component, wherein the disassembly element acts on the leg in the direction of opening the coupling.

10 Claims, 2 Drawing Sheets

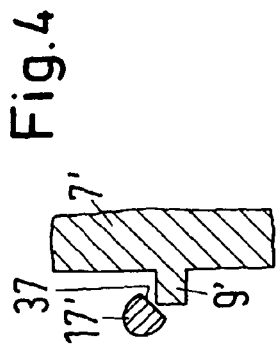
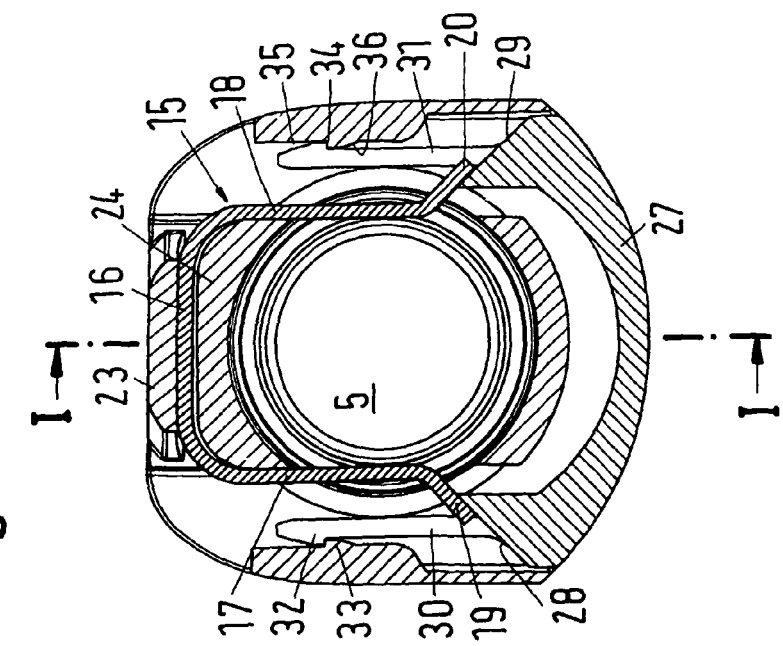

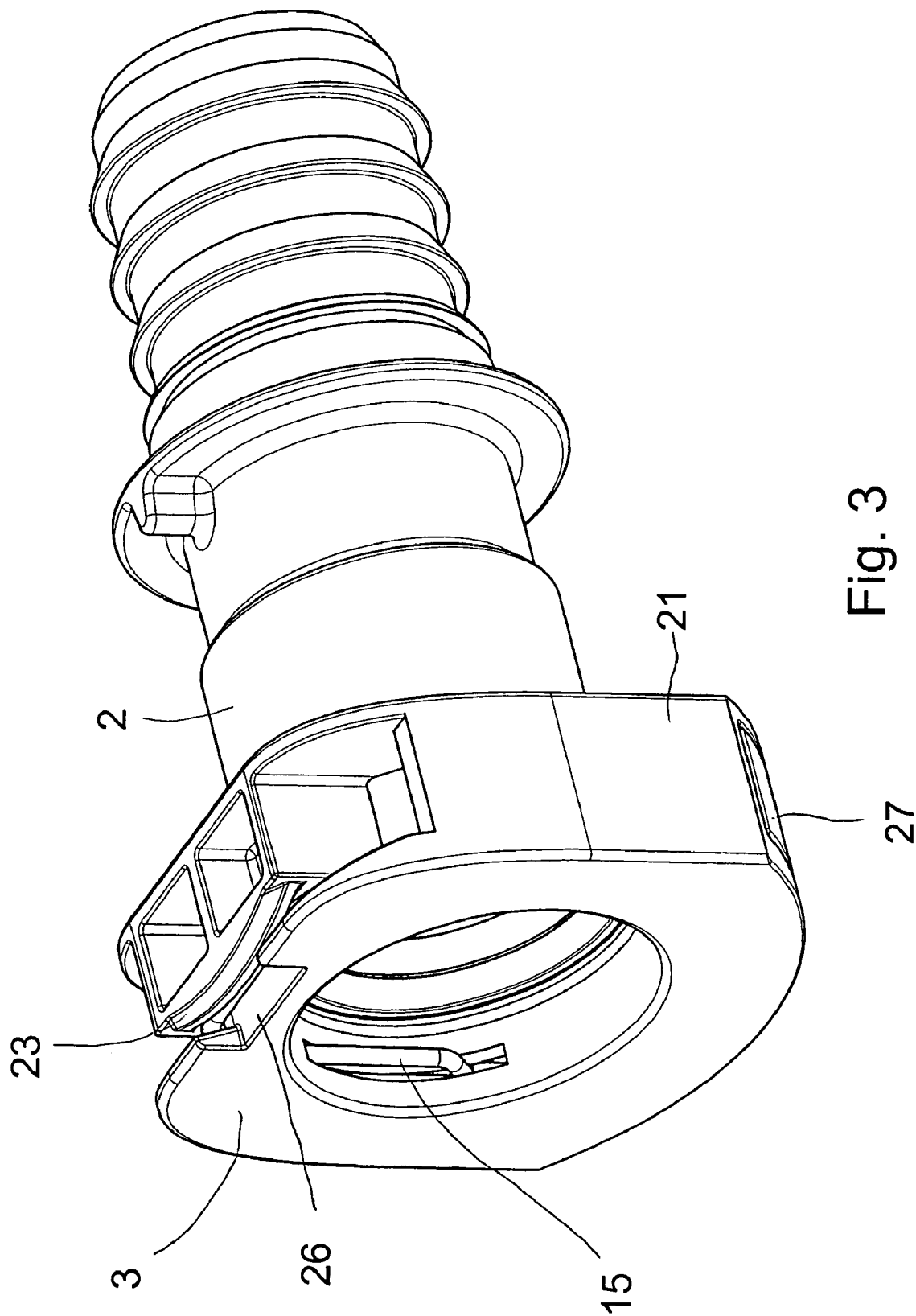

PLUG-TYPE COUPLING

BACKGROUND OF THE INVENTION

1. Field of the Invention

The present invention relates to a plug-type coupling for connecting two fluid lines. The coupling includes a coupling component which has an opening with an adjacent receiving duct, and a coupling piece which is inserted into the receiving duct and has a holding rib which extends from its circumference outwardly and forms a locking surface, wherein the holding rib interacts with a locking stirrup which has at least one leg which is resilient toward the opening.

2. Description of the Related Art

A plug-type coupling has the purpose of connecting two fluid lines with each other. The coupling component is attached to one fluid line and the coupling piece is connected to the other fluid line. For connecting the two fluid lines, the coupling piece is inserted into the receiving duct of the coupling component.

To ensure that this connection is not separated unintentionally, the coupling component includes a locking stirrup. In conventional couplings, this locking stirrup is constructed as a U-shaped spring stirrup of a spring wire. The coupling component has lateral slots, so that the locking stirrup can be slid approximately radially onto the coupling component. The two legs of the locking stirrup then project to some extent into the free cross-section of the receiving duct. When the coupling piece is inserted, the two legs are spread apart by the holding rib and, after passing the holding rib, the legs once again slap together behind the holding rib, so that the coupling piece can no longer be pulled out axially from the coupling component.

If the plug-type coupling is to be separated again, the locking stirrup has to be pulled out radially from the coupling housing, so that the holding rib is free of the two legs. For this purpose, it is necessary to either act on the base of the locking stirrup which connects the two legs; this frequently requires a tool. If a tool is not to be used, the two legs must protrude on the side facing away from the base to such an extent from the coupling housing that by pressing on one of the two legs, the locking stirrup can be displaced to such an extent that it can be grasped. However, such a configuration has the disadvantage that there is the significant danger that the coupling will open by itself.

SUMMARY OF THE INVENTION

It is the primary object of the present invention to provide a plug-type coupling which can be disengaged without the risk of opening by itself.

In accordance with the present invention, in a plug-type coupling of the above-described type a disassembly element is movably mounted in the coupling component, wherein the disassembly element acts on the leg in the direction of opening the coupling.

Accordingly, in accordance with the configuration according to the present invention, a tool is placed in the coupling component which can be used for unlocking the locking stirrup. For unlocking the coupling, it is merely necessary to act from the outside on the disassembly element and to displace the disassembly element. During this displacement, the disassembly element acts on the locking stirrup and pivots or bends the leg. This causes the leg to be disengaged from the holding rib so that the coupling piece can be moved out of the coupling component. Accordingly, the plug-type coupling contains all structural components which are necessary for locking and unlocking the coupling, so that no additional tools are required.

The locking stirrup is preferably U-shaped with two legs and a base connecting the legs, wherein the disassembly element is displaceable in a direction extending perpendicularly of the base. Then this assembly element acts on both legs simultaneously. The displacement or shifting of the disassembly element has the effect that the two legs are spread apart. This spreading causes the two legs to be separated from the holding rib so that the coupling piece can be pulled out of the coupling component. For unlocking the plug-type coupling, it is only necessary to apply pressure on the disassembly element. This pressure can be usually produced manually, so that no tools are required for actuating the disassembly element.

The disassembly element preferably has at least one inclined surface which interacts with the leg. The inclined surface improves the spreading effect. The disassembly element then acts essentially as a wedge which causes the leg or the legs to be spread apart.

In accordance with a particularly preferred feature, the leg has an upwardly angled portion which is acted upon by the disassembly element. This configuration further improves the spreading effect so that the distance by which the disassembly element has to be shifted is not too great in order to disconnect the coupling. The smaller the distance by which the disassembly element has to be moved, the smaller the structural height of the coupling component can be. For example, if an angle of 45° is used between the inclined surface and the angled portion of the leg and the direction of movement of the disassembly element, the distance required for the disassembly element for unlocking the coupling is only approximately 1.4 times the radial extension of the holding rib. Accordingly, it is sufficient if the distance is only a few millimeters.

The disassembly element is preferably held in the coupling component in a positively engaging manner. The positive engagement makes it possible that the disassembly is movable for unlocking the locking stirrup. On the other hand, the locking stirrup prevents the disassembly element from falling out of the coupling component.

In accordance with a preferred feature, the disassembly element has at least one leg which is resilient transversely of its direction of movement, wherein a fast projection is arranged on the resilient leg. The first projection interacts with a second projection in the coupling component. If the disassembly element is pressed into the coupling component, the two projections are moved apart from each other in the direction of movement. The resilient effect of the leg causes the disassembly element to be pushed back outwardly when a force acting from the outside is no longer there. However, the movement of the disassembly element toward the outside can only continue as long as the two projections are once again in contact with each other.

In accordance with a preferred feature, each of the two projections have on one side thereof a holding surface extending perpendicularly of the direction of movement and an inclination of the opposite side in the direction of movement. This facilitates the assembly. It is possible to simply insert the disassembly element into the coupling component. When the two inclinations slide on each other, the leg is bent radially inwardly until the first projection has traveled past the second projection. The first projection then engages behind the second projection. If two oppositely located legs are used on the disassembly element, a relatively high holding force is produced which can certainly not be opened without acting on it from the outside.

In accordance with a preferred feature, the arm is arranged in the axial direction of the receiving duct outside of a range in which the leg is arranged. Accordingly, the leg and the arm do not collide with each other. Rather, it is ensured that in spite of the presence of the arm, the leg can be moved to a efficient extent radially outwardly in order to be separated from the holding rib.

The disassembly can preferably be moved in a direction from the coupling component at most up to a position in which it is flush with the outer contour of the coupling component. This further reduces the risk that the coupling will open by itself. Any forces which act on the outside of the coupling component are for the most part absorbed by the coupling component without there being the danger that the disassembly element is pressed in. The plug-type coupling can only be unlocked by acting in a targeted manner exclusively on the disassembly element.

The locking stirrup is preferably held in a positively engaging manner in the coupling component. The coupling component ensures that the locking stirrup can act with sufficient resistance against the opening force of the disassembly element, so that the locking stirrup practically does not change its position in the coupling component when the disassembly element acts on the locking stirrup; rather, only the leg is spread apart in order to be separated form the holding rib.

It is preferred in this connection that the coupling component has a receiving space for the locking stirrup which on the side opposite the disassembly element is covered by a housing section. The housing section ensures that the locking stirrup cannot be pushed in the direction of movement of the disassembly element out of the coupling component. Since the locking stirrup engages with both legs around a housing part of the coupling component, it is not possible to displace the locking stirrup transversely of the direction of movement of the disassembly element. The locking stirrup is held in axial direction of the receiving duct by the front end borders of the receiving space, so that the locking stirrup, once it has been inserted into a coupling component, can no longer be removed from the coupling component without an appropriate disassembly procedure. However, this is not required, because the locking stirrup can be spread apart sufficiently by the disassembly element to be able to release the coupling piece.

In accordance with a preferred feature, the housing section is convexly arched, wherein the rounded section is facing the end face of the coupling component. The locking stirrup is made of a spring wire. Accordingly, the stirrup can be deformed to a certain extent. For inserting the locking stirrup, the base of the stirrup has to be moved past the housing section. This can be relatively easily achieved by slightly bending the base of the locking stirrup. This bending usually has the result that the basis becomes arched along a circle. In this condition, the base can be moved. Subsequently, the base once again returns into its original state, so that it is located underneath the housing section and can be held by the housing section.

The housing preferably extends at its end face up to the level of the housing section and has an interruption at the area of the greatest extension of the housing section. This interruption can be used to guide the base. Moreover, the extension of the housing at the end face has the purpose of preventing the locking stirrup being movable out of the housing of the coupling component in the direction of the end face.

The holding rib preferably has on the side facing the locking surface an inclined surface. This inclined surface can be used for outwardly spreading the locking stirrup, or more precisely its leg or its two legs, when the coupling piece is inserted into the coupling component. As soon as the two legs are spread apart from each other to a sufficient extent, the coupling piece can be inserted fully into the coupling component. Subsequently, the legs once again snap back behind the holding rib and the coupling piece is initially removably held in the coupling component. The coupling piece can only be removed if the two legs of the coupling stirrup are once again spread apart from each other by using the disassembly element. However, this requires an intentional act so that there is practically no danger that the coupling will open by itself.

As an alternative or additional feature, it may be provided that the leg is inclined on its side facing the opening. In that case, it is also possible to use a holding rib which is not provided with an inclined surface, but rather has, for example, a rectangular cross-section. In that case, the downward driving force necessary for spreading the legs is produced by the inclined portion of the leg.

It is additionally advantageous if the locking stirrup is of metal and the disassembly element of a plastics material. Using a metal, the desired spring properties can be realized while the structural size can be kept small. Also, a metal is usually solid enough for being able to absorb any possible correction forces which act on the coupling piece for separating the coupling. Low forces are required for separating the coupling. Consequently, a plastic component can be used for unlocking. It is possible without difficulties to find a pairing of a plastics material and a metal which can slide with low friction on each other.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a longitudinal sectional view taken along sectional line I-I in FIG. 2;

FIG. 2 is a sectional view taken along section line II-II in FIG. 1, shown without coupling piece;

FIG. 3 is a perspective view of the coupling component; and

FIG. 4 is a sectional view of a modified embodiment of a locking stirrup.

DETAILED DESCRIPTION OF THE INVENTION

FIG. 1 shows a plug-type coupling 1 in longitudinal section. The coupling 1 has a coupling component 2 which has at its end face 3 an opening 4. The opening 4 is located adjacent a receiving duct 5.

The coupling component 2 is connected to a connecting piece 6 on which can be fastened in the conventional manner a fluid line, for example, a hose.

A coupling piece 7 is inserted through the opening 4 into the receiving duct 5. The coupling piece 7 is connected to a connecting piece 8 which protrudes out of the coupling component 2, wherein a hose or another fluid line can also be attached to the connecting piece in a manner which is not illustrated. The connecting piece 8 may also be a component of a unit, for example, a cooler in a motor vehicle.

The coupling piece has a circumferentially extending holding rib 9 which forms on its side facing the connecting piece 8 a locking surface 10. The holding rib 9 may also be interrupted in the circumferential direction.

On its side opposite the locking surface 10, the holding rib 9 has an inclined surface 11.

A sealing arrangement 12 is arranged between the coupling piece 7 and the coupling component 2. The sealing arrangement 12 includes a round rope sealing ring 13 and a holding ring 14. However, the sealing arrangement 12 can also be configured differently as long as it is ensured that no fluid can escape at the connecting point 10, the coupling component 2 and the coupling piece 7.

In the position illustrated in FIG. 1, the coupling piece 7 is held by a locking stirrup 15 which is of a U-shaped configuration and includes a base 16 and two legs 17, 18 adjacent the base 16. Each leg 17, 18 has at its end an angled portion 19, 20. The locking stirrup 15 is made of a spring wire so that the two legs 17, 18 can be resilient relative to the base 16. FIG. 2 shows a position of rest. From this position of rest, the two legs 17, 18 can be spread outwardly.

The locking stirrup 15 is arranged in the housing 21 of the coupling component 2 in a receiving space 22. The receiving space 22 is covered by a housing section 23. The locking stirrup 15 is inserted with its base 16 between the housing section 23 and an annular wall 24 which surrounds the receiving duct 15; in other words, the locking stirrup 15 cannot be moved or only moved to a small extent parallel to the extension of the legs 17, 18.

The housing section 23 has on its end face an inclined surface 25. Moreover, as can be particularly seen in FIG. 3, the housing portion 23 is convexly rounded, whereby it protrudes in the direction toward the end face 3. The housing 21 is extended at its end face 3 up to the level of the housing section 23. However, the end face 3 has in the area of the housing section 23 an interruption 26. When placing the locking stirrup 15 in the coupling component 2, the base 16 of the locking stirrup 15 must be slightly bent, so that its curvature corresponds to the arch of the housing section 23. Once the base 16 has passed the housing section 23, and the locking stirrup can relax, the base 16, as illustrated in FIGS. 1 and 2, is located between the annular wall 24 and the housing section 23.

On the side facing opposite the base 16, a disassembly element 27 is placed in the housing 21. The disassembly element 27 is of a synthetic material. It is used as a sliding member which can be moved in the direction toward the base 16, i.e., into the housing 21 of the coupling component 22.

The disassembly element 27 has two inclined surfaces 28, 29 which interact with the angled portions 19, 20 of the locking stirrup 15. Preferably, at least in the position of rest illustrated in FIG. 2, the two sections 19, 20 at the corresponding inclined surfaces 28, 29 have the same inclination relative to the direction of movement, for example, an inclination of 45°.

When the disassembly element 27 is moved toward the base 16 of the locking stirrup 15, then the two inclined surfaces 28, 29 press against the two sections 19, 20 and thereby move apart the two legs 17, 18 of the locking stirrup 15. The distance between the two legs 17, 18 becomes greater. The sealing space 22 has sufficient space for allowing the two legs 17, 18 to be spread apart relatively far. The entire spreading process takes place in the interior of the housing 21, so that there are no parts of the locking stirrup 15 which protrude outwardly.

The disassembly element 27 has two arms 30, 31. These two arms 30, 31 are arranged in the axial direction of the receiving duct behind the locking stirrup 15. In relation to the illustration of FIG. 1, this arrangement is to the right of the locking stirrup 15. Accordingly, the arms 30, 31 do not pose any resistance to the spreading movement of the sections 17, 18 of the locking stirrup 15.

Each arm 30, 31 has at its end a first projection 32. The first projection 32 interacts with a second projection 33 in the housing 21 of the coupling component 2. The two projections 32, 33 are then located against each other at a holding surface which extends essentially perpendicularly of the direction of movement of the disassembly element 27. On the side facing the holding surface 34, the first projection 32 has an inclined surface 35. Similarly, the second projection 33 has on the side facing the holding surface 34 also an inclined surface. When the disassembly element 27 is placed in the housing 21, the two arms 30, 31 resiliently move slightly inwardly, so that the first projections 32 can slide past the second projections 33, until the position behind the second projections 33 is reached as illustrated in FIG. 2.

Accordingly, the disassembly element 27 is held in a positively engaging manner in the housing 21 of the coupling component 2. The interaction of the projections 32, 33 ensures that the disassembly element 27 cannot be moved out of the coupling component 2, but rather the contour of the disassembly element 27 in the outermost position thereof follows the contour of the housing 21.

When the coupling piece 7 is places in the coupling component 2, the inclined surface 11 of the holding rib 9 spreads apart the two legs 17, 18, so that the holding rib 9 can be moved past the locking stirrup 15. Once the holding rib 9 has been moved past the two legs 17, 18, the two legs 17, 18 return and then engage behind the locking surface 10. The coupling piece 7 is then initially inseparably held in the coupling component 2.

In order to be able to once again pull the coupling piece 7 out of the coupling component 2, the disassembly element 27 is simply pressed in the direction toward the base 16 of the locking stirrup 15. This causes the disassembly element 27 to have its two legs 17, 18 spread apart to such an extent that they are separated from the locking surface 10 and the holding rib 9 can protrude between the two legs 17, 18. In this state, the coupling piece 7 can be moved out of the coupling component 2.

The disassembly element 27 can be pressed into the housing 21 simply by the pressure of a finger. When the force acting on the disassembly element 27 becomes smaller, the legs 17, 18, which are resilient inwardly, press the disassembly element 27 once again into the initial position shown in FIG. 2 in which the two projections 32, 33 are in contact with each other.

In the embodiment of FIG. 1, the holding rib 9 is provided with an inclined surface 11 in order to spread apart the legs 17, 18 of the locking stirrup 15.

FIG. 4 shows in a sectional view two elements of a modified embodiment of the plug-type coupling in which the components which correspond to those of FIGS. 1 and 2 are provided with the same reference numerals with the addition of a prime.

Thus, a connecting piece 7' includes a holding rib 9' which has an essentially rectangular cross-section. The leg 17 of the locking stirrup 15 is provided for this purpose with an inclined surface 37, so that when a pressure is applied by the holding rib 9' the stirrup can also be pivoted outwardly.

The locking stirrup 15 is preferably of a spring steel and the disassembly element 27 of a plastics material which interacts with low friction with the spring steel. This safely prevents the coupling from opening by itself. The actuation for an intentional opening of the coupling has become simple. The weight of the coupling remains small.

While specific embodiments of the invention have been shown and described in detail to illustrate the inventive principles, it will be understood that the invention may be embodied otherwise without departing from such principles.

We claim:

1. A plug-type coupling for connecting two fluid lines, the coupling comprising:
   a coupling component having a housing, an opening and an adjacent receiving duct;
   a coupling piece inserted into the receiving duct, the coupling piece having a holding rib protruding from a circumference thereof outwardly and forming a locking surface,
   wherein the holding rib and a locking stirrup are configured to interact,
   wherein the locking stirrup has at least one leg which is resilient parallel to the opening; and
   a disassembly element formed as a sliding member linearly movable into the housing of the coupling component, wherein the disassembly element is configured to act on the at least one leg in an opening direction, wherein the locking stirrup is U-shaped with two legs and a base connecting the two legs, and wherein the disassembly element is mounted so as to be slidable in a direction extending perpendicularly to the base, wherein the disassembly element has at least one leg to positively engage the disassembly element in the housing, wherein the at least one leg of the disassembly element is arranged in the axial direction of the receiving duct outside of an area in which the leg is located, wherein the disassembly element is movable in a direction out of the coupling component up to a position in which the disassembly element is flush with the outer contour of the coupling component, and wherein the coupling component has a receiving space for the locking stirrup, wherein the receiving space is covered on a side opposite the disassembly element by a housing section, wherein the disassembly element has two inclined surfaces that interact with the locking stirrup.

2. The coupling according to claim 1, wherein the at least one leg has an outwardly angled section on which the disassembly element acts.

3. The coupling according to claim 1, wherein the disassembly element is mounted with positively locking engagement in the coupling component.

4. The coupling according to claim 1,
   Wherein the resilient leg has a first projection configured to interact with a second projection on the coupling component,
   wherein the first and second projections each have a support surface extending perpendicularly of the direction of movement on one side, and wherein each projection has an inclined surface on the oppositely located side in the direction of movement.

5. The coupling according to claim 1, wherein the locking stirrup is mounted with positive engagement in the coupling component.

6. The coupling according to claim 1, wherein the housing section is convexly rounded, wherein the rounded portion is directed toward an end face of the coupling component.

7. The coupling according to claim 6, wherein the housing extends at the end face thereof up to a level of the housing section, and wherein the housing has a recess in an area of greatest extension of the housing section.

8. The coupling according to claim 1, wherein the holding rib has an inclined surface on a side located opposite the locking surface.

9. The coupling according to claim 1, wherein the at least one leg is inclined on its side facing the opening.

10. The coupling according to claim 1, wherein the locking stirrup is of metal and the disassembly element is of a synthetic material.

* * * * *